United States Patent
Good et al.

(10) Patent No.: US 7,620,394 B2
(45) Date of Patent: Nov. 17, 2009

(54) REUSING FREQUENCIES OF A FIXED AND/OR MOBILE COMMUNICATIONS SYSTEM

(75) Inventors: Alexander H. Good, McLean, VA (US); Charlene J. King, Washington, DC (US); Eric A. Swank, Leesburg, VA (US); Monish Kundra, Arvada, CO (US); Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 637 days.

(21) Appl. No.: 11/358,846

(22) Filed: Feb. 21, 2006

(65) Prior Publication Data

US 2006/0189309 A1 Aug. 24, 2006

Related U.S. Application Data

(60) Provisional application No. 60/655,199, filed on Feb. 22, 2005.

(51) Int. Cl.
 *H04W 4/00* (2009.01)
(52) U.S. Cl. ............... 455/427; 455/571; 455/426.2; 455/74.1; 455/554.1; 455/554.2; 455/555; 455/13.1; 455/446; 455/450; 370/235; 370/310.2; 370/278; 370/316; 370/317; 340/853.8; 340/854.1; 340/854.6; 340/855.3; 340/855.5; 340/10.1; 340/10.4; 340/572.1; 340/435; 340/901; 340/902; 340/903; 340/904; 340/919; 340/913
(58) Field of Classification Search ........... 455/427, 455/426.2, 74.1, 554.1, 554.2, 555; 370/235, 370/278, 310.2, 316, 317; 340/853.8, 854.1, 340/854.6, 854.5, 10.1, 10.4, 572.1, 435, 340/901–904, 913, 919

See application file for complete search history.

(56) References Cited

U.S. PATENT DOCUMENTS 4,901,307 A 2/1990 Gilhousen et al.
5,073,900 A 12/1991 Mallinckrodt (Continued)

FOREIGN PATENT DOCUMENTS

EP 0 506 255 A2 9/1992

(Continued)

OTHER PUBLICATIONS

International Search Report for PCT/US2006/006131; date of mailing Dec. 28, 2006.

(Continued)

*Primary Examiner*—Rafael Pérez-Gutiérrez
*Assistant Examiner*—Nimesh Patel
(74) *Attorney, Agent, or Firm*—Myers Bigel Sibley & Sajovec

(57) ABSTRACT

A communications system includes a first wireless communications system configured to provide wireless communications over a first frequency band, and a second wireless communications system configured to provide wireless communications using at least a portion of the first frequency band. The system includes an inter-system communications link between the first wireless communications system and the second wireless communications system. The inter-system communications link is used to coordinate the use of the first frequency band. The system further includes an interference reducer configured to reduce interference between the first wireless communications system and the second wireless communications system. Related methods are also disclosed.

17 Claims, 5 Drawing Sheets

U.S. PATENT DOCUMENTS

| | | | |
|---|---|---|---|
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,884,181 A * | 3/1999 | Arnold et al. ............... 455/450 | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,421,342 B2 * | 9/2008 | Churan ............... 701/213 | |
| 2001/0006517 A1 * | 7/2001 | Lin et al. ............... 370/348 | |
| 2002/0012381 A1 * | 1/2002 | Mattisson et al. ......... 375/132 | |
| 2002/0122408 A1 | 9/2002 | Mullins | |
| 2002/0146979 A1 * | 10/2002 | Regulinski et al. ......... 455/13.1 |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0040342 A1 * | 2/2003 | Coan et al. ............... 455/571 |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192338 A1 * | 9/2004 | Bacon et al. ............. 455/456.1 |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |
| WO | WO 02/065535 A2 | 8/2002 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

Communication Relating to the Results of the Partial International Search; Date of Mailing Jul. 14, 2006.

* cited by examiner

REUSING FREQUENCIES OF A FIXED AND/OR MOBILE COMMUNICATIONS SYSTEM

CLAIM OF PRIORITY

This application claims the benefit of provisional Application No. 60/655,199, filed Feb. 22, 2005, entitled "Reusing Frequencies of a Fixed and/or Mobile Communications System," the disclosure of which is hereby incorporated by reference herein as if set forth in its entirety.

FIELD OF THE INVENTION

This invention relates to communications systems and methods, and more particularly to terrestrial wireless and/or space-based communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "mobile terminal" or simply as a "terminal". As used herein, the term(s) "radioterminal," "radiotelephone," mobile terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to co-inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some of the same satellite frequency band and using substantially the same air interface for both terrestrial and satellite communications may be cost effective and/or aesthetically appealing. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to co-inventor Karabinis, entitled Satellite System Utilizing a Plurality of Air Interface Standards and Method Employing Same.

Satellite radiotelephone communications systems and methods that may employ terrestrial reuse of satellite frequencies are described in U.S. Pat. No. 6,684,057 to Karabinis, entitled Systems and Methods for Terrestrial Reuse of Cellular Satellite Frequency Spectrum; and Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radiotelephone systems and methods may employ interference cancellation techniques to allow terrestrial reuse of satellite frequencies. For example, as described in U.S. Pat. No. 6,684,057 to Karabinis, cited above, a satellite radiotelephone frequency can be reused terrestrially by a terrestrial network even within the same satellite cell that is using the satellite radiotelephone frequency, using interference cancellation techniques. Moreover, the terrestrial network can use a modified range of satellite band forward link frequencies for transmission, to reduce interference with out-of-band receivers. A modified range of satellite band forward link frequencies that is used by the terrestrial network can include only a subset of the standard satellite band forward link frequencies to provide a guard band, can include power levels that monotonically decrease as a function of increasing frequency and/or can include two or more contiguous slots per frame that are left unoccupied and/or are transmitted at reduced maximum power. Time division duplex operation of the terrestrial network may also be provided over at least a portion of satellite band return frequencies. Full or partial reverse mode operation of the terrestrial network also may be provided, where at least some of the forward link and return link frequencies are interchanged with the conventional satellite forward link and reverse link frequencies. See the Abstract of U.S. Pat. No. 6,684,057.

Other radiotelephone systems and methods can monitor terrestrial reuse of satellite-band frequencies to reduce potential interference. For example, as described in Published U.S. Patent Application No. US 2003/0054814 A1, cited above, radiation by a terrestrial network, and/or satellite radiotelephones that communicate therewith are monitored and controlled, to reduce and preferably prevent intra-system interference and/or interference with other satellite radiotelephone systems. In particular, a satellite radiotelephone system includes a space-based component that is configured to wirelessly communicate with first radiotelephones in a satellite footprint over a satellite radiotelephone frequency band, and a terrestrial network that is configured to wirelessly communicate with second radiotelephones in the satellite footprint over at least some of the satellite radiotelephone frequency band, to thereby terrestrially reuse the at least some of the satellite radiotelephone frequency band. Wireless radiation by the terrestrial network and/or the second radiotelephones at the space-based component is monitored, and the radiation by the terrestrial network and/or the plurality of second radiotelephones is adjusted in response to the monitoring. Intra-system interference and/or interference with other satellite systems thereby may be reduced or prevented. See the Abstract of U.S. Published Patent Application US 2003/0054814 A1.

Finally, additional systems and methods may be used to monitor terrestrially reused satellite frequencies to reduce potential interference. For example, as described in Published U.S. Patent Application No. US 2003/0073436 A1, cited above, a satellite radiotelephone system includes a space-based component, a terrestrial network, a monitor and a controller. The space-based component is configured to wirelessly communicate with radiotelephones in a satellite footprint over a satellite radiotelephone frequency band. The satellite footprint is divided into satellite cells in which subsets of the satellite radiotelephone frequency band are spatially reused in a spatial reuse pattern. The terrestrial network is configured to wirelessly communicate with radiotelephones in the satellite footprint over at least some of the satellite radiotelephone frequency band, to thereby terrestrially reuse the at least some of the satellite radiotelephone frequency band. The monitor is configured to monitor wireless radiation at the space-based component that is produced by the terrestrial network and/or the radiotelephones in satellite cells that adjoin a satellite cell and/or in the satellite cell, in at least part of the subset of the satellite radiotelephone frequency band that is assigned to the satellite cell for space-based component communications. The controller is configured to adjust the radiation by the terrestrial network and/or the radiotelephones, in response to the monitor. See the Abstract of U.S. Published Patent Application U.S. 2003/0073436 A1.

SUMMARY

Some embodiments of the invention provide a communications system including a fixed wireless communications system configured to provide wireless communications over a first frequency band and a second wireless communications system configured to provide wireless communications using at least a portion of the first frequency band. An inter-system communications link may be provided between the fixed wireless communications system and the second wireless communications system configured to coordinate the use of the first frequency band, and the system further may include an interference reducer configured to reduce interference between the fixed wireless communications system and the second wireless communications system.

The fixed wireless communications system may include a substantially geostationary space-based component, and the second wireless communications system may include a terrestrial component.

The fixed wireless communications system may employ a first air interface protocol and the second wireless communications system may employ a second air interface protocol. The first air interface protocol may be different compared to the second air interface protocol, and/or the first and second air interface protocols may be substantially the same. The interference reducer may be configured to reduce interference in the fixed communications system and/or second wireless communications system.

The first air interface protocol may include a plurality of resources, and the fixed wireless communications system and/or the second wireless communications system may be configured to coordinate the use of the resources. The resources include spreading codes, channels, sub-channels, carriers, sub-carriers, time intervals and/or time slots.

The fixed wireless communications system and/or the second communications system may be configured to allocate and/or de-allocate at least one resource of the plurality of resources to the fixed wireless communications system and/or the second communications system, and the fixed wireless communications system and/or the second communications system may be configured to notify the fixed wireless communications system and/or the second communications system of the allocation and/or de-allocation of the at least one resource. The second communications system may include a fixed and/or mobile communications system.

A communications system according to some embodiments of the invention includes a first wireless communications system configured to provide wireless communications over short range wireless communications links using a first frequency band, a second wireless communications system configured to provide wireless communications using at least a portion of the first frequency band, and an inter-system communications link between the first wireless communications system and the second wireless communications system configured to coordinate the use of the first frequency band. The system further includes an interference reducer configured to reduce interference between the first wireless communications system and the second wireless communications system.

The first wireless communications system may include an access point configured to provide communications to/from vehicles, and the second wireless communications system may include a base station configured to provide communications to/from wireless terminals.

An antenna of the base station may be configured to transmit in a direction that does not include transmitters and/or receivers of the first wireless communications system.

The first wireless communications system may employ a first air interface protocol and the second wireless communications system may employ a second air interface protocol. The first air interface protocol may be different compared to the second air interface protocol, and/or the first and second air interface protocols may be substantially the same.

The interference reducer may be configured to reduce interference in the first and/or second wireless communications system(s).

The first air interface protocol may include a plurality of resources, and the first wireless communications system and/or the second wireless communications system may be configured to coordinate the use of the resources. The resources include spreading codes, channels, sub-channels, carriers, sub-carriers, time intervals and/or time slots.

The first wireless communications system and/or the second wireless communications system may be configured to allocate and/or de-allocate at least one resource of the plurality of resources to the first wireless communications system and/or the second wireless communications system. The first wireless communications system and/or the second wireless communications system may be configured to notify the first wireless communications system and/or the second wireless communications system of the allocation and/or de-allocation of the at least one resource.

Some embodiments of the invention provide a communications system including a first space-based system configured to transmit/receive information wirelessly using a first frequency band, and a second wireless system configured to transmit/receive information wirelessly using at least a portion of the first frequency band. An inter-system communications link is provided between the first space-based system and the second wireless system configured to coordinate the use of the first frequency band, and an interference reducer is configured to reduce interference between the first space-based system and the second wireless system.

The first space-based system may include at least one substantially geostationary satellite and/or at least one non-geostationary satellite, and the second wireless system may include at least one substantially geostationary satellite and/or at least one ancillary terrestrial component.

The first space-based system may use a first air interface protocol and the second wireless system may use a second air interface protocol. The first air interface protocol may be different compared to the second air interface protocol, and/or the first and second air interface protocols may be substantially the same. The interference reducer may be configured to reduce interference in the second wireless system due to signals from the first space-based system. The interference reducer may be configured to reduce interference in the first space-based system due to signals from the second wireless system.

The first air interface protocol may include a plurality of resources and the first space-based system and/or the second wireless system may be configured to coordinate the use of the resources. The resources may include spreading codes, channels, sub-channels, carriers, sub-carriers, time intervals and/or time slots.

The first space-based system and/or the second wireless system may be configured to allocate and/or de-allocate at least one of the plurality of resources to the first space-based system and/or the second wireless system. The first space-based system and/or the second wireless system may be configured to notify the first space-based system and/or the second wireless system of the allocation and/or de-allocation of the at least one resource.

Methods of reducing interference between a first wireless communications system and a second wireless communications system according to some embodiments of the invention include providing wireless communications from the first wireless communications system using a frequency band, providing wireless communications from the second wireless communications system using at least a portion of the frequency band, establishing an inter-system communications link between the first wireless communications system and the second wireless communications system to coordinate the use of the frequency band, and coordinating the use of the frequency band using the inter-system communications link to thereby reduce interference between the first wireless communications system and the second wireless communications system.

The first wireless communications system may include a space-based and/or terrestrial component and the second wireless communications system may include a terrestrial component.

The first wireless communications system may employ a first air interface protocol and the second wireless communications system may employ a second air interface protocol. The first air interface protocol may be different compared to the second air interface protocol. The first and second air interface protocols may be substantially the same.

The first air interface protocol may include a plurality of resources, and the method further may include coordinating the use of at least one resource of the plurality of resources. The plurality of resources may include spreading codes, channels, sub-channels, carriers, sub-carriers, time intervals and/or time slots.

The methods may further include allocating and/or de-allocating at least one resource of the plurality of resources to the first and/or second communications system, and notifying the first and/or second communications system of the allocation and/or de-allocation of the at least one resource.

Methods for reducing interference between a first wireless communications system and a second wireless communications system sharing at least some frequencies of a frequency band according to some embodiments of the invention include establishing an inter-system communications link between the first wireless communications system and the second wireless communications system, and coordinating the use of the frequency band using the inter-system communications link to thereby reduce interference between the first wireless communications system and the second wireless communications system.

Some embodiments of the invention provide methods for reducing interference between a geostationary satellite communications system and a non-geostationary satellite communications system sharing at least some frequencies of a frequency band, including establishing an inter-system communications link between the geostationary communications system and the non-geostationary communications system, and coordinating the use of the frequency band using the inter-system communications link, to thereby reduce interference between the geostationary communications system and the non-geostationary communications system.

A wireless communications system according to some embodiments of the invention is configured to provide wireless communications using at least some frequencies that are authorized for use and/or are used by a second wireless communications system. The wireless communications system includes an inter-system communications link between the wireless communications system and the second wireless communications system configured to coordinate the use of the at least some frequencies, and an interference reducer configured to reduce interference between the wireless communications system and the second wireless communications system.

The wireless communications system may include at least one space-based and/or terrestrial component and the second wireless communications system may include at least one space-based and/or terrestrial component.

The at least one space-based component of the wireless communications system may include at least one substantially geostationary satellite and the at least one space-based and/or terrestrial component of the second wireless communications system may include at least one substantially geostationary satellite.

The at least one space-based component of the wireless communications system may include at least one substantially geostationary satellite and the at least one space-based and/or terrestrial component of the second wireless communications system may include at least one non-geostationary satellite.

The at least one space-based component of the wireless communications system may include at least one substantially geostationary satellite and the at least one space-based and/or terrestrial component of the second wireless communications system may include at least one short-range communications link.

Some embodiments of the invention provide an interference reducer that is configured to reduce interference in a wireless communications system that is configured to use at least some frequencies of a frequency band that may be authorized for use and/or may be used by a second wireless communications system. The interference reducer is configured to use an inter-system communications link between the wireless communications system and the second wireless communications system to reduce interference between the wireless communications system and the second wireless communications system.

A wireless communications system according to further embodiments of the invention includes a space-based component and at least one terrestrial component. The space-based component may be configured to receive a signal from a radioterminal over a plurality of different polarizations and the wireless communications system may be configured to provide wireless communications using at least some frequencies that are authorized for use and/or are used by a second wireless communications system. The second wireless communications system may include at least one space-based component and/or at least one terrestrial component. The second wireless communications system may be Inmarsat, Iridium, Globalstar, ICO, XM-Satellite Radio and/or Sirius Satellite Radio.

Some embodiments of the invention provide methods of providing wireless communications in a wireless communications system using at least some frequencies that are authorized for use and/or are used by a second wireless communications system, including providing an inter-system communications link between the wireless communications system and the second wireless communications system, providing an interference reducer configured to reduce interference between the wireless communications system and the second wireless communications system, and coordinating the use of the at least some frequencies by the wireless communications system and/or the second wireless communications system using the inter-system communications link.

According to some further embodiments of the invention, methods of providing wireless communications in a wireless communications system including a space-based component and at least one terrestrial component, wherein the wireless communications system is configured to provide wireless communications using at least some frequencies that are authorized for use and/or are used by a second wireless communications system including at least one space-based component and/or at least one terrestrial component. The methods include receiving a signal at the space-based component of the wireless communications system from a radioterminal over a plurality of different polarizations. The second wireless communications system may be Inmarsat, Iridium, Globalstar, ICO, XM-Satellite Radio and/or Sirius Satellite Radio.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
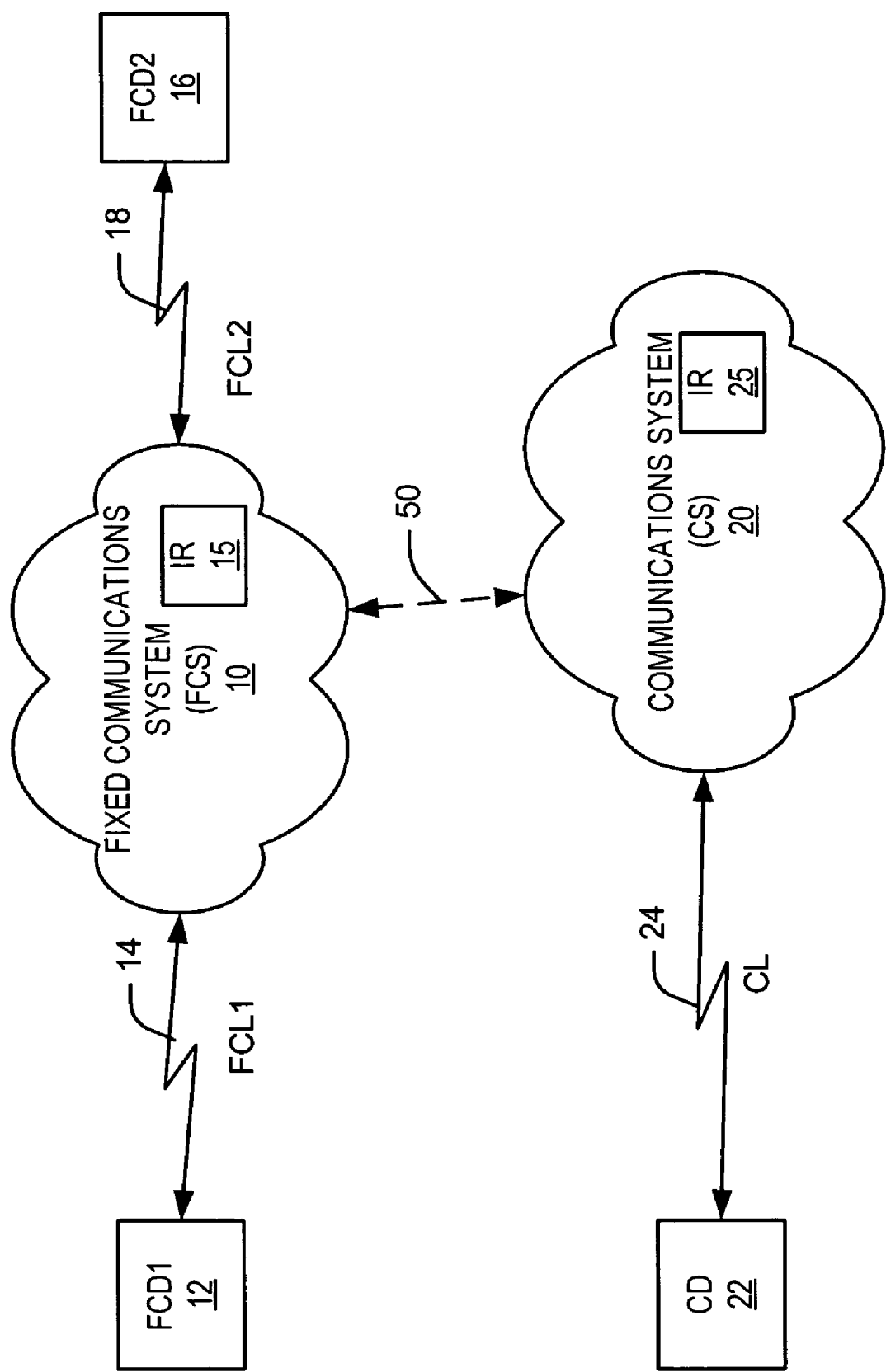
FIG. 1 is a schematic diagram of communications systems and methods according to embodiments of the invention including a fixed communications system and a second communications system.

Embodiments of the present invention may be advantageously employed by wireless system operators operating networks within respective service regions that may be non-overlapping, partially overlapping and/or overlapping. For example, some embodiments of the invention may be employed by a single operator desiring to operate a first communications system, such as, for example, a broadcast system and a second communications system, such as, for example, a wireless cellular/PCS/satellite system, using at least some of the same and/or overlapping frequency bands in a same, different and/or overlapping service region. In other embodiments according to the invention, two systems may cooperatively share at least some frequencies and/or use overlapping frequency bands in a same, different and/or overlapping service region(s) to provide communications services within the service region(s). For example, by employing embodiments of the invention, one operator may provide consumer voice/data communications services within a particular service region over a particular frequency band, while another operator may cooperatively provide other services, such as, for example, emergency communications services, broadcast services, satellite communications services and/or short-range wireless communications services within the same, different and/or overlapping frequency bands and service region(s) with reduced interference.

The ability to provide multiple communications services on at least partially overlapping frequency bands may help to alleviate at least some problems associated with frequency allocation, may provide additional efficiency with which spectrum is utilized and/or may provide an economic benefit to a system. For example, in the United States, the allocation of wireless communications frequency bands is controlled by the Federal Communication Commission (FCC). Frequency bands are allocated by frequency and/or geographical area. In the past, certain frequency bands that are adjacent to and/or overlapping with frequency bands allocated for emergency communications have been allocated by the FCC to commercial network operators. As usage of such frequency bands by commercial operators has increased, there has been a corresponding increase in the amount of interference experienced by emergency communications systems operating in adjacent frequency bands in the same geographical area, and/or in the same frequency bands in adjacent geographical areas. Such interference may be problematic, and in some cases harmful, as it may impede the ability of users, such as, for example, first responders, to quickly and effectively receive/understand information.

Moreover, since new applications for wireless services are constantly being identified, there may be increasing pressure for government(s) as well as private concerns to utilize available bandwidth more effectively and/or efficiently in order to provide new services that are deemed to be commercially important and/or important for the public welfare.

Accordingly, some embodiments of the invention may substantially increase and/or improve utilization of scarce spectrum within a given service region, or within adjacent service regions, by coordinating frequency use/re-use by multiple communications systems in order to reduce potential interference between the communications systems.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first space-based component below could be termed a second space-based component, and similarly, a second space-based component may be termed a first space-based component without departing from the teachings of the present invention. As used herein, the term "and/or" includes any and all combinations of one or more of the associated listed items. The symbol "/" is also used as a shorthand notation for "and/or".

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Moreover, as used herein, "substantially the same" band(s) means that two to more frequency bands being compared substantially overlap, but that there may be some areas of non-overlap, for example at a band end and/or elsewhere. "Substantially the same" air interface(s) means that two or more air interfaces being compared are similar but need not be identical. For example, a first air interface (i.e., a satellite air interface) may include some differences relative to a second air interface (i.e., a terrestrial air interface) to, for example, account for one or more different characteristics of a communications/propagation environment and/or to address other performance aspects and/or system concerns associated with the first and/or second air interface.

For example, a different vocoder rate may be used for satellite communications compared to the vocoder rate that may be used for terrestrial communications (e.g., for terrestrial communications, audio signals may be encoded ("vocoded") at a rate of approximately 9 to 13 kbps or higher, whereas for satellite communications a vocoder rate of approximately 2 to 4 kbps may be used). Likewise, a different forward error correction code, different interleaving depth, and/or different spread-spectrum codes may also be used, for example, for satellite communications compared to a code, interleaving depth, and/or spread spectrum codes (i.e., Walsh codes, short codes, long codes, and/or frequency hopping codes) that may be used for terrestrial communications.

The terrestrial use/reuse of satellite-band service-link frequencies has been proposed to, and accepted by, the Federal Communications Commission (FCC) and Industry Canada (IC). See, e.g., Report and Order and Notice of Proposed Rulemaking, FCC 03-15, "Flexibility for Delivery of Communications by Mobile Satellite Service Providers in the 2 GHz Band, the L-Band, and the 1.6/2.4 Bands", IB Docket No. 01-185, Adopted: Jan. 29, 2003, Released: Feb. 10, 2003, and Industry Canada, Spectrum Management and Telecommunications Policy DGTP-006-04 "Spectrum and Licensing Policy to Permit Second Terrestrial Mobile Services as Part of Mobile-Satellite Service Offerings," May 2004. Also see, e.g., Memorandum Opinion and Order and Second Order on Reconsideration, FCC 05-30, IB Docket No. 01-185; Adopted: Feb. 10, 2005, Released: Feb. 25, 2005.

Some embodiments of the invention may perform adaptive signal processing, including beam-forming (i.e., antenna pattern shaping), interference suppression, channel estimation and multi-user detection in a system including a first non-mobile (e.g. fixed) and/or mobile communications system and a second fixed and/or mobile communications system, with frequency use/reuse of frequencies of the other system in the first and/or second system. Beam-forming, based on a Minimum Mean-Squared Error (MMSE) performance index, for example, may be used to increase a signal-to-noise plus interference ratio of communications links in an environment characterized by reuse of frequencies.

In some embodiments, a MMSE algorithm may be used to adaptively form a beam (i.e., antenna pattern) for a user by processing a set of antenna signals. Following beam-forming (i.e., antenna pattern forming), parameters of user channels may be estimated. In some embodiments, user channel information may be used to perform interference suppression as well as multi-user detection. Multi user detection and interference cancellation may be performed as described, for example in U.S. patent application Ser. No. 11/324,711 filed Jan. 3, 2006, entitled "ADAPTIVE BEAM FORMING WITH MULTI-USER DETECTION AND INTERFERENCE REDUCTION IN SATELLITE COMMUNICATIONS SYSTEMS AND METHODS", the disclosure of which is incorporated herein by reference as if fully set forth herein.

While the term "interference canceller" and related terms such as "interference cancellation" and "interference canceling" are used herein to describe elements, systems and methods according to embodiments of the invention, it will be appreciated that while some interference reduction techniques may be referred to as "interference cancellation," some residual interference may remain in a signal even after "interference cancellation." That is, as with any physical process, complete elimination of interference may be impossible or impractical, even in so-called "optimal" systems.

Some embodiments of the invention may mitigate interference in a first wireless communications system that may be caused by use/reuse of at least some frequencies of a second system by the first system.

For example, FIG. 1 is a block diagram of systems and methods, according to embodiments of the present invention that can use/reuse at least some frequencies of a fixed wireless communications system. As used herein, a "fixed wireless communications system" is a wireless communications system that provides communications to/from devices that remain substantially immobile during the communications. For example, devices that are permanently or semi-permanently fixed on the Earth and/or boats/ships and/or devices that may be transportable but need to remain substantially immobile during a communications session. In particular, FIG. 1 illustrates a fixed wireless communications system (FCS) 10 comprising a first fixed communications link (FCL1) 14 providing communications between a first fixed communications device (FCD1) 12 and the fixed communications system 10 using at least a portion of a first band of frequencies and at least a second fixed communications link (FCL2) 18 providing communications between a second fixed communications device (FCD2) 16 and the fixed communications system 10 using at least a portion of a second band of frequencies. The first and second band of frequencies may be substantially overlapping, partially overlapping or non-overlapping. In particular, the fixed communications devices FCD1 12 and FCD2 16 may be fixed wireless terminals, such as fixed Digital Broadcast Service (DBS) receivers, in which case the first and second band of frequencies may be partially or substantially overlapping. Alternatively, the first fixed communications device FCD1 12 may be a fixed DBS receiver, whereas the second fixed communications device FCD2 16 may be a satellite gateway, in which case the first and second bands of frequencies may be non-overlapping, partially overlapping, or overlapping. The fixed communications links 14, 18 may be bi-directional or unidirectional links. Bidirectional links may operate in full and/or half duplex mode.

FIG. 1 further illustrates a wireless second communications system CS 20 and/or method including at least one fixed and/or mobile wireless communications link CL 24 providing communications between at least one fixed and/or mobile communications device CD 22 and the second communications system CS 20. The at least one uni-directional and/or bi-directional communications link CL 24 of the second communications system CS 20 may be configured to provide communications between the at least one communications device CD 22 and the second communications system 20 using at least one frequency of the first and/or second band of frequencies. The second communications system 20 may be a space-based and/or terrestrial wireless communications system. Accordingly, the second communications system 20 may include a space-based component (not illustrated in FIG. 1), comprising at least one satellite, which may, in accordance with some embodiments of the invention, be configured to receive a signal from a radioterminal over a plurality of substantially different/orthogonal polarizations such as, for example, a substantially Left Hand Circular Polarization (LHCP) and a substantially Right Hand Circular Polarization (RHCP), to thereby improve a communications link measure such as, for example, a signal strength, a Bit Error Rate (BER) and/or an information transmission rate. The space-based component of the second communications system 20 may also be configured to receive the signal from the radioterminal over a plurality of spatially diverse antenna elements and/or different antenna patterns to further improve a communications link measure such as, for example, a signal strength, a Bit Error Rate (BER) and/or an information transmission rate. The radioterminal may be configured to transmit the signal to the space-based component of the second communications system 20 in a substantially linearly-polarized orientation to thereby reduce a complexity and/or cost measure of the radioterminal. The second communications system 20 may also include at least one terrestrial component, which may include an antenna configured to receive a signal from a radioterminal over a plurality of different polarizations and/or antenna patterns/elements. In some embodiments, the antenna of the terrestrial component of the second communications system 20 may be configured to transmit a signal to the radioterminal over a substantially circular polarization that may be substantially different compared to a circular polarization used by another system, to thereby reduce a component of interference at the other system that may be caused by the signal transmitted by antenna of the terrestrial component of the second communications system 20.

Still referring to FIG. 1, an inter-system communications link 50 (identified by the dashed line) is provided between the fixed communications system FCS 10 and the second communications system CS 20. The inter-system communications link 50 may be used to coordinate, configure and/or reconfigure frequency use/reuse by the second communications system CS 20 of at least some frequencies of the first and/or second band of frequencies of the fixed communications system FCS 10. Frequency use/reuse may be coordinated, configured and/or reconfigured using one or more of the systems/methods described in the patents or published U.S. patent applications referenced above for satellite communications systems and methods that employ terrestrial use/reuse of satellite frequencies. The inter-system communications link 50 may be an electronic communications link such as, for example, a wired and/or wireless communications link and/or a non-electronic communications link, such as, for example, a link that provides information via conventional mail and/or person-to-person communications (i.e., a face-to-face meeting during which agreement(s)/coordination is/are reached). The inter-system communications link 50 may be any link/mechanism/process that provides bidirectional or unidirectional information flow, at any rate, slow or fast. Further, the inter-system communications link 50 may be a dedicated link and/or a switched link including a packet switched link. The inter-system communications link 50 may include multiple links and/or hops between the fixed communications system FCS 10 and the second communications system CS 20.

The inter-system communications link 50 may also be used to provide inputs to at least one or more interference reducers 15, 25 within the fixed communications system 10 and the second communications system 20, respectively, that may be configured to reduce interference in the fixed communications system FCS 10 caused by frequency use/reuse of the at least some frequencies of the first and/or second band of frequencies by the second communications system CS 20 and/or to reduce interference in the second communications system CS 20 caused by use/reuse of one or more frequencies of the first and/or second band of frequencies by the fixed communications system FCS 10. An interference reducer and/or monitor may be provided, for example, as was described in the above-cited U.S. Pat. No. 6,684,057 and/or published U.S. Patent Application Nos. US 2003/0054814 A1 or US 2003/0073436 A1.

Furthermore, in some embodiments, particular multiple access resources, such as codes (CDMA), channels (FDMA) and/or time slots (TDMA) of a multiple-access communication protocol may be dedicated for use by a particular communications system. Alternatively or additionally, some multiple access resources may be pooled and used on an as-needed basis by a particular communications system.

Usage of such resources may be coordinated by the communications systems 10, 20 using the inter-system communications link 50. In other embodiments, in addition to or instead of the above, the inter-system communications link 50 may be configured to provide timing/synchronization information unidirectionally or bidirectionally between the systems 10, 20.

Figure 2:
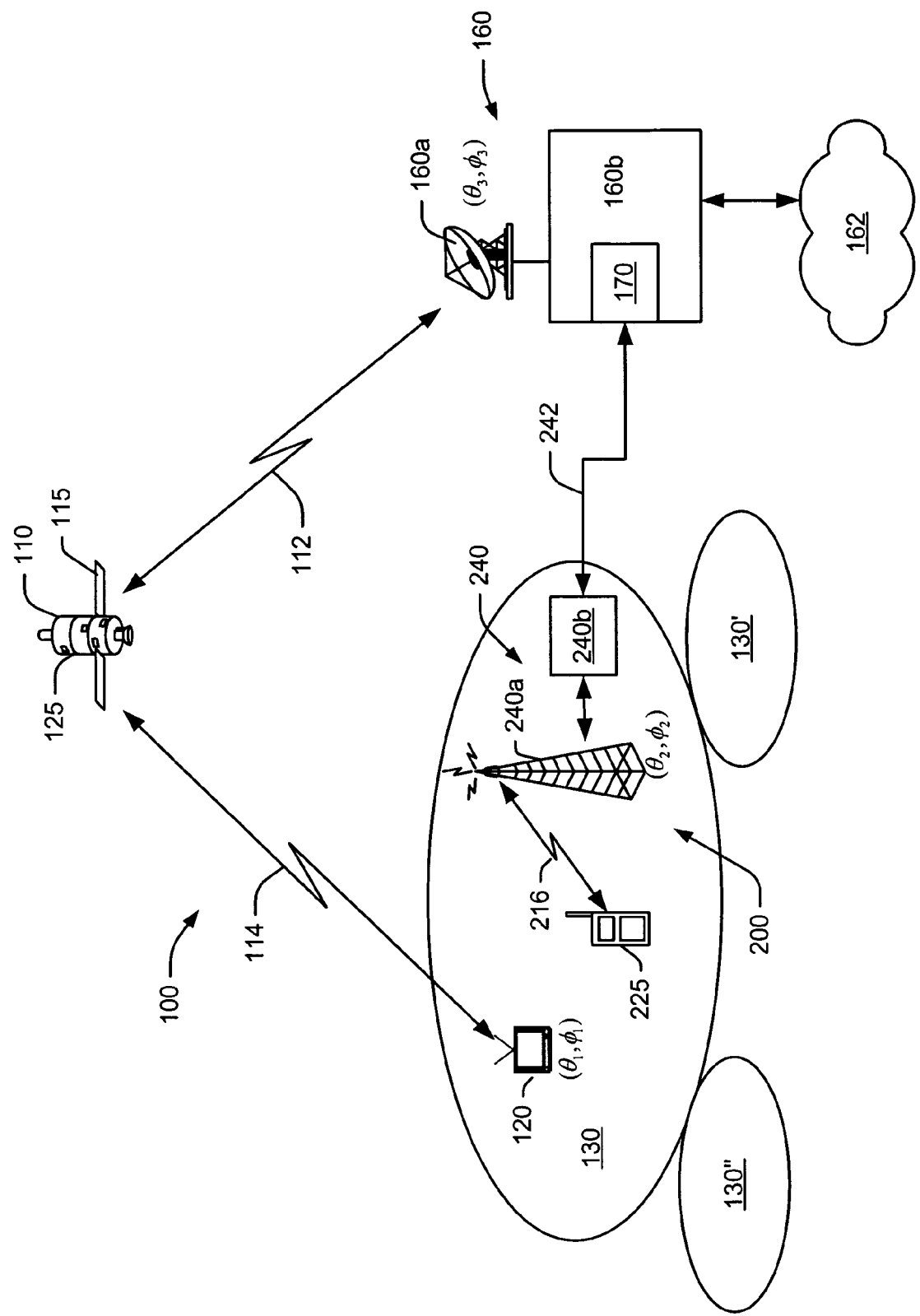
FIG. 2 is a schematic diagram of communications systems and methods according to embodiments of the invention including a first geostationary satellite based communications system and a second wireless communications system.

FIG. 2 is a schematic diagram of communications systems and methods, including fixed/mobile satellite communications systems, according to other embodiments of the invention. In particular, FIG. 2 illustrates a first communications system 100 and a second communications system 200 which are configured to use/reuse frequencies in a common service region. The first communications system 100 is a fixed/mobile satellite communications system and the second communications system 200 is a wireless terrestrial communications system.

As shown in FIG. 2, the first system 100 includes a space-based component 110, such as, for example, at least one geostationary orbiting satellite and/or at least one non-geostationary orbiting satellite. A geostationary orbiting satellite orbits the earth at a trajectory that is substantially above the equator, at an altitude of approximately 35,786 km, at which the orbit has substantially the same period as the earth's rotation. Thus, a geostationary satellite appears to remain substantially at the same point in the sky at all times.

The space-based component 110 may be configured to selectively use a set of frequencies that belong to a band of frequencies that the system 100 is authorized to use and to transmit wireless communications signals to a plurality of fixed/mobile wireless terminals, only one of which is illustrated in FIG. 2 (wireless terminal 120), in a satellite footprint including one or more satellite cells 130-130", over one or more satellite forward service link (downlink) frequencies $f_D$ over a service link 114. The space-based component 110 may also be configured to receive wireless communications from a plurality of wireless terminals, such as fixed/mobile wireless terminal 120 in the satellite cell 130, over one or more satellite return service link (uplink) frequencies $f_U$ over the service link 114. In some embodiments of the invention, the system 100 may be a Satellite Digital Audio Radio Broadcast Service (S-DARS) system such as, for example, the XM-Satellite Radio and/or the Sirius Satellite Radio system.

The first communications system 100 further includes at least one satellite gateway 160 configured to communicate with the space-based component 110 using a feeder link 112. The satellite gateway 160 of FIG. 2 may correspond to the second fixed communication device FCD2 16 of FIG. 1, and the feeder link 112 of FIG. 2 may correspond to the second fixed communication link FCL2 18 of FIG. 1. Further, the fixed/mobile wireless terminal 120 FIG. 2 may correspond to the first fixed communication device FCD1 12 of FIG. 1 and the service link 114 of FIG. 2 may correspond to the first communication link FCL1 14 of FIG. 1. The feeder link 112 may use at least a portion of a second band of frequencies and the service link 114 may use at least a portion of a first band of frequencies wherein the first and second band of frequencies may be substantially overlapping, partially overlapping or non-overlapping.

The second communications system 200 may be a space-based and/or terrestrial wireless communications system. Accordingly, the second communications system 200 may include a space-based component (not illustrated in FIG. 2), comprising at least one satellite, which may, in accordance with some embodiments of the invention, be configured to receive a signal from a radioterminal over a plurality of substantially different/orthogonal polarizations such as, for example, a substantially Left Hand Circular Polarization (LHCP) and a substantially Right Hand Circular Polarization (RHCP), to thereby improve a communications link measure such as, for example, a signal strength, a Bit Error Rate (BER) and/or an information transmission rate. The space-based component of the second communications system 200 may also be configured to receive the signal from the radioterminal over a plurality of spatially diverse antenna elements and/or different antenna patterns to further improve a communications link measure such as, for example, a signal strength, a Bit Error Rate (BER) and/or an information transmission rate. The radioterminal may be configured to transmit the signal to the space-based component of the second communications system 200 in a substantially linearly-polarized orientation to thereby reduce a complexity and/or cost measure of the radioterminal. The second communications system 200 may also include at least one terrestrial component 240, which may include an antenna 240a configured to receive a signal from a radioterminal over a plurality of different polarizations and/or antenna patterns/elements. In some embodiments, the antenna 240a may be configured to transmit a signal to the radioterminal over a substantially circular polarization that may be substantially different compared to a circular polarization used by another system, to thereby reduce a component of interference at the other system that may be caused by the signal transmitted by antenna 240a. The terrestrial component 240 may also include an electronics system 240b, and the terrestrial component 240 may be configured to receive wireless communications signals from, for example, at least one fixed/mobile wireless terminal 225 over an uplink (i.e., return link) frequency, denoted $f'_U$, that may be within a satellite frequency band authorized for use by space-based component 110 (e.g., within the first and/or the second band of frequencies). The frequency $f'_U$ may be the same as an uplink or downlink frequency used for communicating with the space-based component 110 in the satellite cell 130 in which the wireless terminal 225 is located and/or in an adjacent or remotely-located satellite cell 130. Thus, as illustrated in FIG. 2, the fixed/mobile wireless terminal 120 of system 100 may be communicating with (i.e., receiving/transmitting information from/to) the space-based component 110 of system 100 using a frequency or frequencies belonging to a satellite frequency band that is authorized for use by system 100 while the fixed/mobile wireless terminal 225 of system 200 and/or the terrestrial component 240 of system 200 (and/or any other element/component of system 200), also may be using the frequency or frequencies belonging to the satellite frequency band that is authorized for use by system 100.

The space-based component 110 may also undesirably receive a component of the wireless communications from the fixed/mobile wireless terminal 225 and/or the terrestrial component antenna 240a in the satellite cell 130 as interference. In addition, the space based component 110 may receive a component of wireless communications from a wireless terminal and/or terrestrial component (not shown) located in a different satellite cell over a satellite frequency that may be the same as (and/or overlapping with) $f_U$ and/or $f'_U$.

More specifically, a signal transmitted by the fixed/mobile wireless terminal 225 and/or the antenna 240a may interfere with satellite communications. This interference would generally be strongest when the transmitted signal uses the same carrier frequency as the cell in question (e.g., $f'_U = f_U$), because, in that case, the same return link frequency would be used for space-based component and terrestrial component communications. However, according to embodiments of the invention, since the fixed/mobile wireless terminal 120 has a location characterized by a azimuth/elevation orientation ($\theta_1$, $\phi_1$) relative to the space-based component 110, that may be known or approximately known, it may be possible, through appropriate selection of beamforming coefficients, to spatially discriminate between the wireless terminal 120 and the wireless terminal 225 and/or antenna 240a in order to reduce a level of interference. For example, through appropriate choices of beamforming coefficients, a beam (i.e., an antenna pattern) having a peak gain at the particular azimuth/elevation location ($\theta 1, \phi 1$) of the terminal 120 may be formed by the space-based component 110 and/or the satellite gateway 160. Even with spatial discrimination, however, interference may impair the signal to/from the wireless terminal 120. Likewise, through appropriate choices of beamforming coefficients, the space-based component 110 and/or the gateway 160 may form a beam (i.e., an antenna pattern) for communicating with the wireless terminal 120 having a spatial null at the azimuth/elevation location ($\theta_2, \phi_2$) of the antenna 240a. The term "spatial null" is used herein in a general sense to refer to directions/areas of significantly reduced signal strength response, and may correspond to, but does not necessarily indicate, a zero or minimum signal strength response at a particular azimuth/elevation.

Furthermore, because the antenna 240a of the terrestrial component 240 is essentially a fixed wireless component that functions to communicate primarily with terrestrial-based wireless terminals, the antenna 240a may be designed, through appropriate configuration and/or shielding of its radiating element, to have a spatial null in the direction of the space-based component 110 to reduce and/or prevent interference at the space-based component 110 from the terrestrial component 240a.

Figure 3:
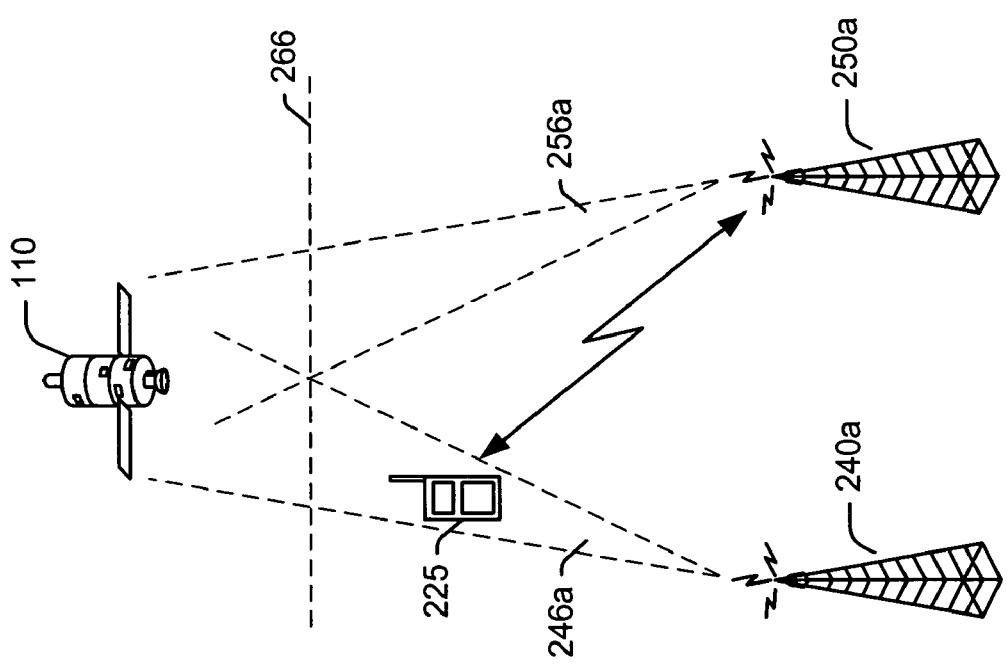
FIG. 3 is a schematic diagram of communications systems and methods according to embodiments of the invention.

Having such a spatial null may limit the ability of a particular antenna 240a to communicate with a fixed/mobile wireless terminal 225 should the fixed/mobile wireless terminal 225 move into and/or near the spatial null (such as, for example, if the fixed/mobile wireless terminal 225 were carried by an airborne vehicle into a region impacted by the spatial null). However, as illustrated in FIG. 3, the terrestrial system 200 may be configured to include multiple antennas 240a, 250a, each of which may have an associated spatial null 246a, 256a directed towards the space-based component 110. The first and second antennas 240a, 250a may be configured such that, for at least a given service region (i.e. up to an altitude 266), the spatial null 256a of an adjacent antenna 250a may not be directed towards the fixed/mobile wireless terminal 225. Thus, the second antenna 250a may be able to communicate with the fixed/mobile wireless terminal 225 while it is located within at least a portion of the spatial null 246a of an antenna 240a.

As a fixed/mobile wireless terminal 225 that is communicating with a first antenna 240a moves into the spatial null 246a of the first antenna 240a, the terrestrial component 240 may detect a corresponding reduction in signal strength of the fixed/mobile wireless terminal 225 and execute a handover to the adjacent antenna 250a. Above the service altitude 266, there may be locations that are blocked by the spatial nulls of antennas 240a, 250b.

The height of the service region altitude 266 may be dependent on the proximity and/or transmit/receive power of adjacent antennas 240a, 250a. The height of the service region altitude 266 may also be dependent on the shape of the spatial null 246a, 256a that is directed toward the space-based component. Moreover, the shape of the spatial null 246a may be designed such that a relatively slow signal roll-off occurs as a function of angle. Thus, when a fixed/mobile wireless terminal 225 moves toward/into the region of the spatial null, the terrestrial component 240 may have adequate time to detect a reduction in signal strength and initiate a handover from an antenna 240a to an adjacent or non-adjacent antenna 250a.

Referring again to FIG. 2, embodiments of satellite communications systems/methods 100 can include at least one satellite gateway 160 that can include an antenna 160a and an electronics system 160b. As with the fixed/mobile wireless terminal 120 and the antenna 240a, the antenna 160a of the satellite gateway 160 is essentially a fixed wireless terminal that has an associated azimuth/elevation location ($\theta_3, \phi_3$) relative to the space-based component 110.

The satellite gateway 160 may be connected to other networks 162, including terrestrial and/or other wired and/or wireless communications networks such as, for example, a public switched telephone network and/or the Internet.

Still referring to FIG. 2, a wired, wireless and/or other inter-system communications link 242 may be provided between the first communications system 100 and the second communications system 200. This communications path may be used to coordinate, configure and/or reconfigure frequency use/reuse by elements of the second communications system such as the antenna 240a and/or the fixed/mobile wireless terminal 225 of at least one frequency that is authorized for use by the first system 100 (i.e., of at least one frequency of the first and/or second band of frequencies of the first communications system 100). The inter-system communications link 242 may be an electronic communications link such as, for example, a wired and/or wireless communications link and/or a non-electronic communications link, such as, for example, a link that provides information via conventional mail and/or person-to-person communications (i.e., a face-to-face meeting during which agreement(s)/coordination is/are reached). The inter-system communications link 242 may be any link/mechanism/process that provides bidirectional or unidirectional information flow, at any rate, slow or fast. Frequency reuse may be coordinated, configured and/or reconfigured using methods and/or systems of one or more of the patents or published U.S. patent applications that were described above for satellite communications systems and methods that employ terrestrial use/reuse of satellite frequencies. The inter-system communications link 242 may also be used to provide inputs to at least one interference reducer 170 that may be configured to reduce interference in the first communications system 100 caused by a frequency use/reuse of the first and/or second band of frequencies of the first communications system 100 by the antenna 240a and/or the fixed/mobile wireless terminal 225 of the second communications system 200 and/or to reduce interference in the second communications system 200 caused by signals transmitted to/from the first communications system 100. Likewise, the second communications system 200 may include an interference reducer that may be configured to reduce interference in the second communications system 200. In some embodiments, the interference reducer and/or monitor may include functionality as provided, for example, in the above-cited U.S. Pat. No. 6,684,057 and/or published U.S. Patent Application Nos. US 2003/0054814 A1 and/or US 2003/0073436 A1.

The Interference Reducer (IR) 170 may be provided at least partially in the gateway electronics system 160b. In yet other alternatives, the interference reducer 170 may be provided at least partially in other components of the first communications system 100 instead of or in addition to the gateway electronics system 160b. For example, an interference reducer 170 may be at least partially provided in the space-based component 110. The interference reducer 170 may be responsive to the space-based component 110 and to the terrestrial component 240, and may be configured to reduce interference in the wireless communications that are received by the space-based component 110. In particular, the interference reducing signal processor 170 may be configured to reduce interference that is at least partially generated by components of the second communications system 200 such as antenna 240a and wireless terminals such as wireless terminal 225 communicating with the terrestrial system 200. In addition, the interference reducer 170 may also be configured to reduce interference from other transmitters such as, for example, transmitters operating inside and/or outside the service region(s) associated with the first and/or second communications systems 100, 200.

Systems and methods disclosed herein may be advantageously utilized in a system employing use/reuse of frequencies of another system in a service region that may be at least partially overlapping and/or adjacent to a service region of the other system. As described above, the second communications system 200 uses/reuses at least some of the satellite-band service link and/or feeder link frequencies of the first communications system 100 to provide additional capacity and/or communications services. It will be understood that, according to some embodiments of the present invention, the communications system 200, as illustrated in FIG. 2, may also comprise space-based communications capability (not shown in FIG. 2 for clarity) and may also be configured to use/reuse at least some of the frequencies of the first communications system 100 to provide additional capacity and/or communications services using the space-based communications capability and/or any non-space-based communications capability such as antenna 240a.

Some embodiments of the present invention may allow one system to use/reuse at least some uplink/downlink frequencies of another system to provide space-based and/or terrestrial communications (i.e., to provide space-based and/or terrestrial transmission and/or reception of information) in which the at least some uplink/downlink frequencies of the other system are used, have been assigned to and/or have been authorized for use by the other system to provide space-based and/or terrestrial communications (i.e., to provide space-based and/or terrestrial transmission and/or reception of information). For example, some embodiments of the present invention provide for the terrestrial and/or space-based use/reuse of at least some frequencies that are used and/or are authorized for use by a Fixed Satellite System (FSS), such as, for example, a Direct Broadcast Satellite (DBS) television/internet system. Other embodiments of the present invention provide for the terrestrial and/or space-based use/reuse of at least some frequencies that are used and/or are authorized for use by a Satellite Digital Audio Radio broadcast Service (S-DARS) system such as, for example, XM-Satellite Radio and/or Sirius Satellite Radio. Further embodiments of the present invention provide for the terrestrial and/or space-based use/reuse of at least some frequencies that are used and/or are authorized for use by a Low Earth Orbit (LEO), Medium Earth Orbit (MEO) and/or Geostationary Earth Orbit (GEO) satellite system such as, for example, Iridium, Inmarsat, Globalstar, ICO and/or TerreStar. Other embodiments of the invention can use/reuse frequencies that are used and/or are authorized for use by a Dedicated Short Range Communications (DSRC) system and/or any other wireless communications system that provides wireless communications over short-range wireless communications links that may, for example, be configured to provide information to/from transportation vehicles. Reuse of DSRC frequencies can provide communications with mobile and/or fixed communications devices that need not be related to transportation information. Other embodiments of the invention can use/reuse frequencies that have been allocated to a Non-Geo-Stationary Orbit (N-GSO) satellite system. By using/reusing frequencies of a fixed and/or mobile communications system, the use of valuable communications spectrum can be increased or maximized.

Figure 4:
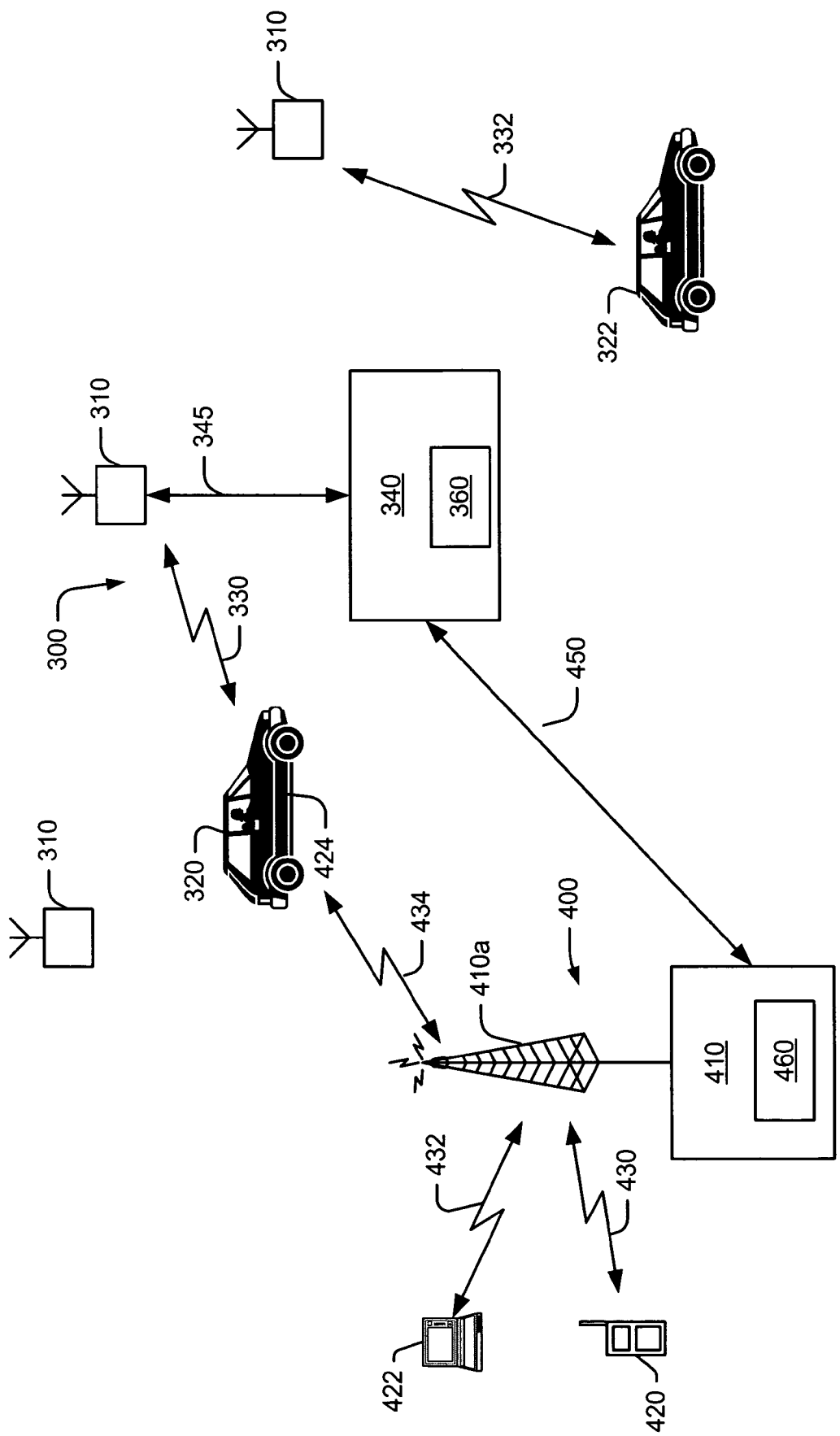
FIG. 4 is a schematic diagram of communications systems and methods according to embodiments of the invention including a dedicated short range communications system and a second wireless communications system.

FIG. 4 illustrates using/reusing frequencies of a Dedicated Short Range Communications (DSRC) system 300 that is, for example, configured to provide information to/from transportation vehicles. The DSRC system 300 may be configured to use, for example, 75 MHz of spectrum that the FCC authorized for "intelligent transportation systems uses" in Oct. 21, 1999 (in the frequency band from 5.850 to 5.925 GHz) to improve highway safety. As further illustrated in FIG. 4, the DSRC system 300 comprises one or more road-side Access Points (AP) 310 configured to exchange information with transceivers that are installed in (passing-by) vehicles 320 via a DSRC link 330. As such, the frequencies used by the DSRC system 300 may be used at or near roads/highways and may remain substantially unused or partially used at a distance from a road and/or highway.

Operation of one or more of the roadside access points 310 may be coordinated and/or controlled by a control unit 340, which may be coupled to one or more roadside access points 310 by communications link(s) 345. The control unit 340 may be configured to establish and/or route communications to the vehicles 320, and may further include an interference reducer 360 configured to reduce interference in the DSRC system 300.

FIG. 4 also illustrates a second communications system 400 comprising at least one base station (i.e., terrestrial component) 410 communicating with, for example, two mobile and/or fixed communications devices 420, 422 and with a third communications device 424 that is inside of a vehicle 320. The base station 410 and the communications devices 420, 422, 424 are configured to communicate using at least one of the frequencies allocated to the DSRC system. The second communications system 400 may be a space-based and/or terrestrial wireless communications system. Accordingly, the second communications system 400 may include a space-based component (not illustrated in FIG. 4), comprising at least one satellite, which may, in accordance with some embodiments of the invention, be configured to receive a signal from a radioterminal over a plurality of substantially different/orthogonal polarizations such as, for example, a substantially Left Hand Circular Polarization (LHCP) and a substantially Right Hand Circular Polarization (RHCP), to thereby improve a communications link measure such as, for example, a signal strength, a Bit Error Rate (BER) and/or an information transmission rate. The space-based component of the second communications system 400 may also be configured to receive the signal from the radioterminal over a plurality of spatially diverse antenna elements and/or different antenna patterns to further improve a communications link measure such as, for example, a signal strength, a Bit Error Rate (BER) and/or an information transmission rate. The radioterminal may be configured to transmit the signal to the space-based component of the second communications system 400 in a substantially linearly-polarized orientation to thereby reduce a complexity and/or cost measure of the radioterminal. The second communications system 400 may also include at least one terrestrial component 410, which may include an antenna 410a configured to receive a signal from a radioterminal over a plurality of different polarizations and/or antenna patterns/elements. In some embodiments, the antenna 410a may be configured to transmit a signal to the radioterminal over a substantially circular polarization that may be substantially different compared to a circular polarization used by another system, to thereby reduce a component of interference at the other system that may be caused by the signal transmitted by antenna 410*a*.

An antenna 410*a* of a base station such as base station 410 may be sectored to improve frequency reuse. That is, the antenna 410*a* of the base station 410 may be configured with separate directional radiating elements that illuminate different sectors of the area surrounding the antenna. In some embodiments of FIG. 4, at least one sector of the base station antenna 410*a* that is serving an area not overlapping or partially overlapping with a road and/or highway is configured to communicate with communications devices 420, 422, 424 using at least one of the frequencies allocated to the DSRC system 300. Further, at least one sector of the base station antenna 410*a* may remain unused in order to provide spatial discrimination between the DSRC system 300 and the second communications system 400. Thus, sectors of the base station antenna 410*a* that may cause unacceptable interference with the DSRC system 300 may be unused or partially used.

The second communications system 400 may further include at least one interference reducer 460 that may be configured, for example, at a base station 410 within the second communications system 400 and/or at any other system element of the second communications system 400.

In other embodiments all sectors of the base station antenna 410*a* (serving geographic areas that are overlapping or non-overlapping with a road and/or highway) may be configured to communicate with communications devices 420, 422, 424 using at least one of the frequencies allocated to the DSRC system 300. In some embodiments, at least one sector of the base station antenna 410*a* is configured to provide a communications priority to a road-side access point 310 in using at least one DSRC system frequency. In other embodiments, the base station 410 and/or the base station antenna 410*a* is/are configured to communicate with the communications devices 420, 422, 424 using at least one DSRC system frequency and an air interface protocol that is different from, or substantially the same as, an air interface protocol used by a road-side access point of the DSRC system. In some embodiments, an air interface protocol used by system 400 may be a Time Division Duplex (TDD) air interface protocol such as, for example, WiMAX and/or a derivative/variant thereof. In other embodiments, the air interface protocol used by system 400 may be a Frequency Division Duplex (FDD) air interface protocol. Accordingly, DSRC frequencies may be used and/or reused by a terrestrial and/or space-based component of a wireless communications system, such as the system 400 illustrated in FIG. 4.

In some cases, the DSRC system 300 and the second communications system 400 may utilize a common or substantially common multiple access air interface protocol. The DSRC system 300 and the second communications system 400 may coordinate the use of multiple access resources (such as codes, channels, sub-channels, carriers, sub-carriers, time slots, etc.) in order to reduce interference between the two systems. Use of the multiple access resources may be coordinated through communications between the DSRC system 300 and the second communications system 400 over a wired and/or wireless inter-system communications link 450. For example, certain multiple access resources may be dedicated for use by the DSRC system 300 and/or the second communications system 400. In some cases, multiple access resources may be allocated to the DSRC system 300 and/or the second communications system 400 on an as-needed basis. The inter-system communications link 450 may be an electronic communications link such as, for example, a wired and/or wireless communications link and/or a non-electronic communications link, such as, for example, a link that provides information via conventional mail and/or person-to-person communications (i.e., a face-to-face meeting during which agreement(s)/coordination is/are reached). The inter-system communications link 450 may be any link/mechanism/process that provides bidirectional or unidirectional information flow, at any rate, slow or fast.

For example, as discussed above, in a CDMA system, a transmitter may be assigned a unique spreading code. Information transmitted by each transmitter is modulated using the transmitter's spreading code. Thus, a signal transmitted by a first transmitter may appear as noise when added to a signal transmitted by a second co-frequency (co-channel) transmitter. A pool of possible carriers, sub-carriers, channels, sub-channels, time slots/intervals and/or spreading codes may be shared by the DSRC system 300 and the second communications-system 400. When a system desires to establish a communications link, the system may allocate at least one carrier, sub-carrier, channel, sub-channel, time slot/interval and/or spreading code to the communications link and notify the other system via the inter-system communications link 450 of the resources in use. The other system may be configured to use that knowledge to reduce interference from signals using at least some of the allocated resources, and/or may avoid using and/or minimize use of at least one of the allocated resources.

In some embodiments, in addition to transmitting a forward link signal from an access point 310, the DSRC system may transmit the forward link signal over the inter-system communication link 450 to the base station 410. The base station 410 may utilize elements of the forward link signal received over the communications link 450 to reduce interference in signals received via the base station antenna 410*a*.

Figure 5:
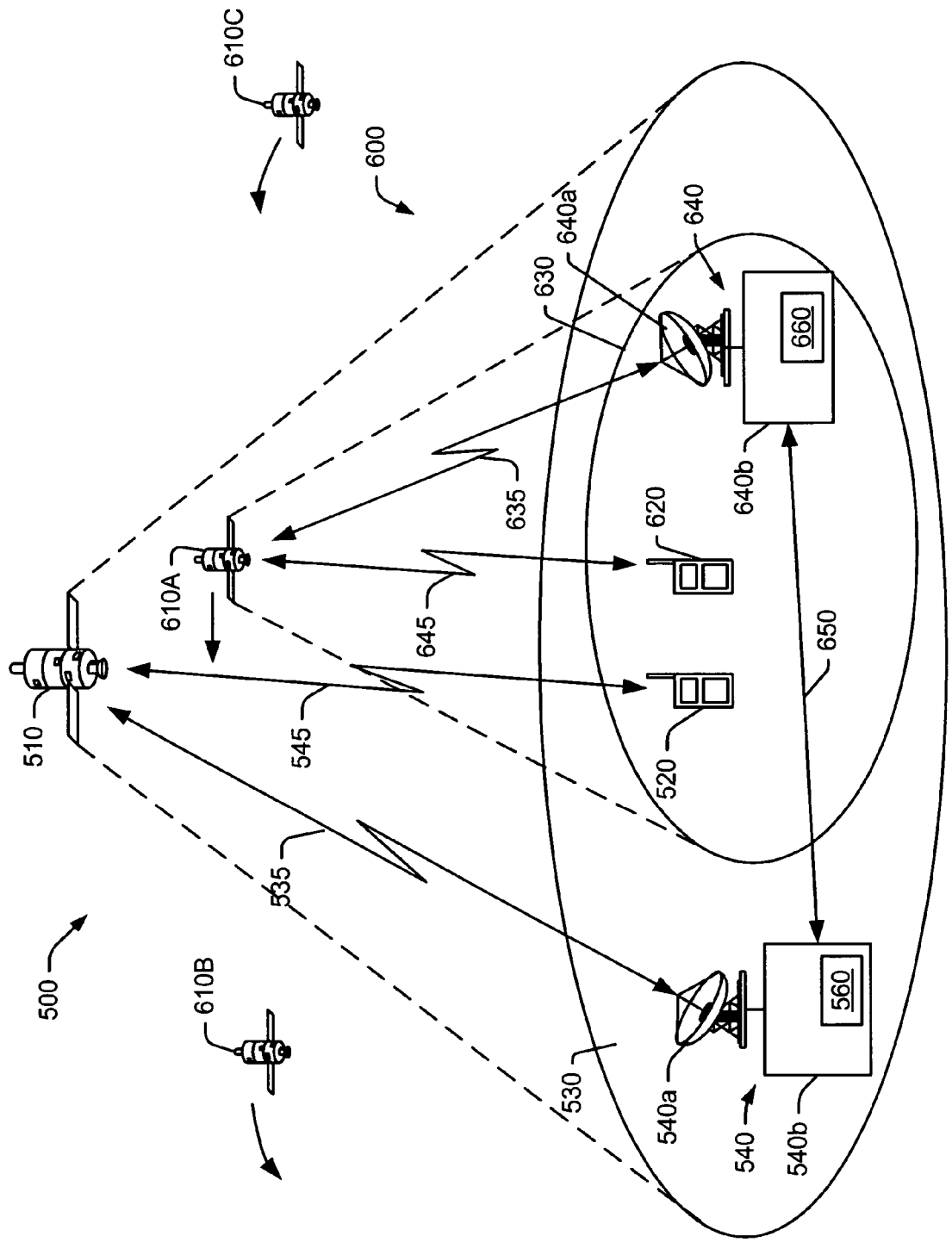
FIG. 5 is a schematic diagram of communications systems and methods according to embodiments of the invention including a non-geostationary satellite communications system and a geostationary satellite communications system.

FIG. 5 illustrates a wireless communications system that is operatively configured to use/reuse at least some of the frequencies that are allocated to and/or used by one or more non-geostationary (N-GSO) satellite system(s) 600 according to embodiments of the invention. More specifically, the N-GSO satellite system(s) 600 may be, for example, a low earth orbit (LEO) and/or medium earth orbit (MEO) satellite system, such as the Iridium and/or Globalstar satellite system(s). LEO and MEO systems include satellites that orbit at elevations lower than a geostationary orbit. Accordingly, a satellite of a MEO and/or LEO system may have a smaller footprint and/or service region compared to a GSO satellite.

As illustrated in FIG. 5, the N-GSO system 600 includes a plurality of MEO and/or LEO space-based components 610A, 610B, 610C, each of which may communicate via a feeder link 635 with a satellite gateway 640 including an antenna 640*a* and an electronics system 640*b*. The electronics system 640*b* may include an interference reducer 660 that may be configured to reduce interference in the N-GSO system 600. It will be understood that the interference reducer 660 may be provided as part of the electronics system 640*b*, as part of another element of system 600 and/or as a stand-alone component.

Since N-GSO space-based components are not geostationary, they appear to move across the sky, as indicated by arrows in FIG. 5. A space-based component 610A may communicate via a service link 645 with a wireless terminal 620 located within a service area 630 of the space based component 610A.

A second communications system 500 may be a substantially geostationary satellite system including at least one substantially geostationary space based component 510 that is configured to communicate with a satellite gateway 540 including an antenna 540*a* and an electronics system 540*b*.

The electronics system 540b may include an interference reducer 560 that may be configured to reduce interference in the system 500. It will be understood that the interference reducer 560 may be provided as part of the electronics system 540b, as part of another element of system 500 and/or as a stand-alone component.

At least some of the service link and/or feeder link frequencies of one or more N-GSO satellite system(s) 600 may be used/reused by the substantially geostationary system 500 and/or ancillary terrestrial components thereof. Interference reduction and/or avoidance techniques, such as those described above, may be used by the N-GSO system 600 and/or the system 500. Interference reduction and/or avoidance may be coordinated by the N-GSO system 600 and the substantially geostationary system 500 using, for example, an inter-system communications link 650 that may be configured to provide bidirectional or unidirectional information between system 600 and system 500 such as, for example, between the satellite gateway 540 of the substantially geostationary communications system 500 and the satellite gateway 640 of the N-GSO communications system 600 as illustrated in FIG. 5. The inter-system communications link 650 may be an electronic communications link such as, for example, a wired and/or wireless communications link and/or a non-electronic communications link, such as, for example, a link that provides information via conventional mail and/or person-to-person communications (i.e., a face-to-face meeting during which agreement(s)/coordination is/are reached). The inter-system communications link 650 may be any link/mechanism/process that provides bidirectional or unidirectional information flow, at any rate, slow or fast. The communications system 500 may be a space-based and/or terrestrial wireless communications system. Accordingly, the communications system 500 may include a space-based component comprising at least one satellite, which may, in accordance with some embodiments of the invention, be configured to receive a signal from a radioterminal over a plurality of substantially different/orthogonal polarizations such as, for example, a substantially Left Hand Circular Polarization (LHCP) and a substantially Right Hand Circular Polarization (RHCP), to thereby improve a communications link measure such as, for example, a signal strength, a Bit Error Rate (BER) and/or an information transmission rate. The space-based component of the communications system 500 may also be configured to receive the signal from the radioterminal over a plurality of spatially diverse antenna elements and/or different antenna patterns to further improve a communications link measure such as, for example, a signal strength, a Bit Error Rate (BER) and/or an information transmission rate. The radioterminal may be configured to transmit the signal to the space-based component of the communications system 500 in a substantially linearly-polarized orientation to thereby reduce a complexity and/or cost measure of the radioterminal. The communications system 500 may also include at least one terrestrial component and the terrestrial component may, in accordance with some embodiments of the invention, be configured to transmit a signal to the radioterminal over a substantially circular polarization that may be substantially different compared to a circular polarization used by another system, to thereby reduce a component of interference at the other system that may be caused by the signal transmitted by the terrestrial component of communications system 500.

In the specification, there have been disclosed embodiments of the invention and, although specific terms are employed, they are used in a generic and descriptive sense only and not for purposes of limitation, the scope of the invention being set forth in the following claims.

What is claimed is:

1. A communications system, comprising:
    a first wireless communications system configured to provide wireless communications over short range wireless communications links using a first frequency band;
    a second wireless communications system configured to provide wireless communications using at least a portion of the first frequency band;
    an inter-system communications link between the first wireless communications system and the second wireless communications system configured to coordinate the use of the first frequency band; and
    an interference reducer configured to receive information over the inter-system communications link regarding communications by the first wireless communications system and/or the second wireless communications system and to reduce interference between the first wireless communications system and the second wireless communications system using the received information, wherein the information comprises a communications signal transmitted by the first wireless communications system and/or the second wireless communications system;
    wherein the first wireless communications system is a Dedicated Short Range Communications (DSRC) system that is configured to provide information to/from transportation vehicles and uses 75 MHz of spectrum that has been authorized for intelligent transportation systems uses in the frequency band from 5.850 to 5.925 GHz;
    wherein the DSRC system comprises one or more road-side access points configured to exchange information with transceivers that are installed in vehicles such that frequencies used by the DSRC system are used at or near roads/highways by the DSRC system and remain substantially unused by the DSRC system at a distance from the roads/highways;
    wherein the second wireless communications system comprises at least one base station that is configured to use at least some frequencies that are also used by the DSRC system; wherein the at least one base station is configured to use the at least some frequencies over areas that are overlapping with the roads/highways; and
    wherein an element of the at least one base station is configured to provide a communications priority to the one or more road-side access points in using at least one DSRC system frequency.

2. The communications system of claim 1, wherein an antenna of the base station is configured to transmit in a direction that does not include transmitters and/or receivers of the first wireless communications system.

3. The communications system of claim 1, wherein the first wireless communications system employs a first air interface protocol and the second wireless communications system employs a second air interface protocol.

4. The communications system of claim 3, wherein the first air interface protocol is different compared to the second air interface protocol.

5. The communications system of claim 3, wherein the first and second air interface protocols are substantially the same.

6. The communications system of claim 3, wherein the interference reducer is configured to reduce interference in the second wireless communications system.

7. The communications system of claim 3, wherein the interference reducer is configured to reduce interference in the first and/or second wireless communications system(s).

8. The communications system of claim 3, wherein the first air interface protocol includes a plurality of resources, and wherein the first wireless communications system and/or the second wireless communications system is/are configured to coordinate the use of the resources.

9. The communications system of claim 8, wherein the resources comprise spreading codes, channels, sub-channels, carriers, sub-carriers, time intervals and/or time slots.

10. The communications system of claim 8, wherein the first wireless communications system and/or the second wireless communications system is/are configured to allocate and/or de-allocate at least one resource of the plurality of resources to the first wireless communications system and/or the second wireless communications system, and wherein the first wireless communications system and/or the second wireless communications system is/are configured to notify the first wireless communications system and/or the second wireless communications system of the allocation and/or de-allocation of the at least one resource.

11. A method of reducing interference between a first wireless communications system and a second wireless communications system, the method comprising:
providing wireless communications from the first wireless communications system using a frequency band;
providing wireless communications from the second wireless communications system using at least a portion of the frequency band;
establishing an inter-system communications link between the first wireless communications system and the second wireless communications system to coordinate the use of the frequency band;
transmitting communications of the first wireless communications system and/or the second wireless communications system via the inter-system communications link; and
reducing interference between the first wireless communications system and the second wireless communications system using communications of the first wireless communications system and/or the second wireless communications system that are transmitted via the inter-system communications link;
wherein the first wireless communications system is a Dedicated Short Range Communications (DSRC) system that is configured to provide information to/from transportation vehicles and uses 75 MHz of spectrum that has been authorized for intelligent transportation systems uses in the frequency band from 5.850 to 5.925 GHz;
wherein the DSRC system comprises one or more road-side access points configured to exchange information with transceivers that are installed in vehicles such that frequencies used by the DSRC system are used at or near roads/highways by the DSRC system and remain substantially unused by the DSRC system at a distance from the roads/highways;
wherein the second wireless communications system comprises at least one base station that is configured to use at least some frequencies that are also used by the DSRC system; wherein the at least one base station is configured to use the at least some frequencies over areas that are overlapping with the roads/highways; and
wherein an element of the at least one base station is configured to provide a communications priority to the one or more road-side access points in using at least one DSRC system frequency.

12. The method of claim 11, wherein the first wireless communications system employs a first air interface protocol and the second wireless communications system employs a second air interface protocol.

13. The method of claim 12, wherein the first air interface protocol is different compared to the second air interface protocol.

14. The method of claim 12, wherein the first and second air interface protocols are substantially the same.

15. The method of claim 12, wherein the first air interface protocol includes a plurality of resources, and wherein the method further comprises coordinating the use of at least one resource of the plurality of resources.

16. The method of claim 15, wherein the plurality of resources comprise spreading codes, channels, sub-channels, carriers, sub-carriers, time intervals and/or time slots.

17. The method of claim 15, further comprising allocating and/or de-allocating at least one resource of the plurality of resources to the first and/or second communications system, and
notifying the first and/or second communications system of the allocation and/or de-allocation of the at least one resource.

* * * * *